(12) United States Patent  (10) Patent No.: US 8,408,573 B2
Hermansen et al.  (45) Date of Patent: Apr. 2, 2013

(54) STEM FOR BICYCLE HANDLEBAR

(75) Inventors: Frank Hermansen, Laguna Beach, CA (US); Carl Winefordner, Laguna Beach, CA (US)

(73) Assignee: Crank Brothers, Inc., Laguna Beach, CA (US)

( * ) Notice: Subject to any disclaimer, the term of this patent is extended or adjusted under 35 U.S.C. 154(b) by 321 days.

(21) Appl. No.: 12/842,929

(22) Filed: Jul. 23, 2010

(65) Prior Publication Data

US 2010/0282017 A1  Nov. 11, 2010

Related U.S. Application Data

(62) Division of application No. 11/732,894, filed on Apr. 5, 2007, now Pat. No. 7,665,928.

(51) Int. Cl.
B62K 21/12  (2006.01)
(52) U.S. Cl. .................................. 280/279; 74/551.3
(58) Field of Classification Search .............. 280/279, 280/281.1, 288.4; 74/551.3
See application file for complete search history.

(56) References Cited

U.S. PATENT DOCUMENTS

| | | | | |
|---|---|---|---|---|
| 5,373,757 A | * | 12/1994 | Bigall | 74/551.3 |
| 5,842,385 A | * | 12/1998 | Su | 74/551.3 |
| 6,343,891 B1 | * | 2/2002 | Combs | 403/391 |
| 7,407,176 B2 | * | 8/2008 | McJunkin et al. | 280/279 |
| 8,020,884 B1 | * | 9/2011 | Foley et al. | 280/279 |
| 8,177,249 B2 | * | 5/2012 | Servet | 280/279 |
| 2006/0099027 A1 | * | 5/2006 | Liao | 403/322.4 |
| 2006/0162482 A1 | * | 7/2006 | Okajima et al. | 74/551.1 |
| 2008/0203697 A1 | * | 8/2008 | Goring | 280/264 |
| 2009/0079160 A1 | * | 3/2009 | Lai | 280/279 |
| 2010/0154583 A1 | * | 6/2010 | Chuang | 74/551.7 |
| 2010/0275723 A1 | * | 11/2010 | Servet | 74/551.1 |

* cited by examiner

*Primary Examiner* — Tashiana Adams
(74) *Attorney, Agent, or Firm* — Haynes and Boone, LLP

(57) ABSTRACT

In one embodiment, a stem for bicycle handlebar and the like includes an arm joining the handlebar with a fork. The arm includes a three-piece wedge on each end that is adjustable by a screw to tighten and loosen a middle clamp of the wedge. The wedge is moved to release and tighten the fork and the handlebar independently.

27 Claims, 6 Drawing Sheets

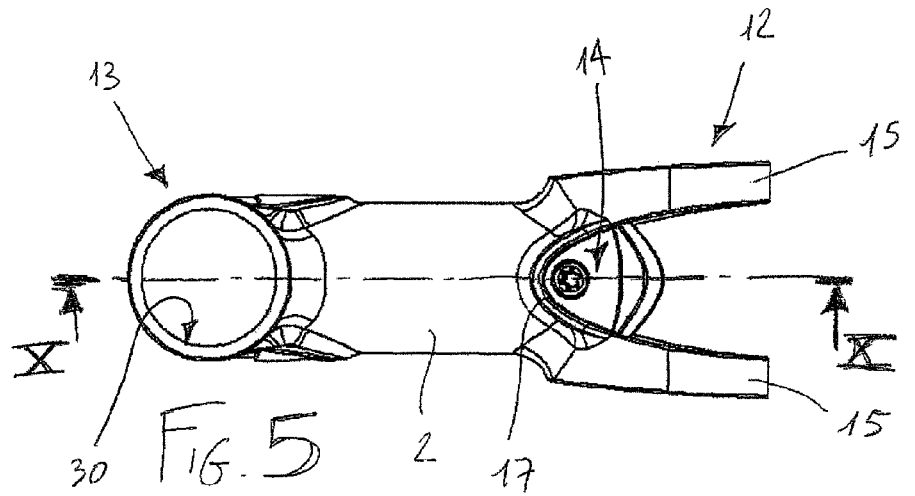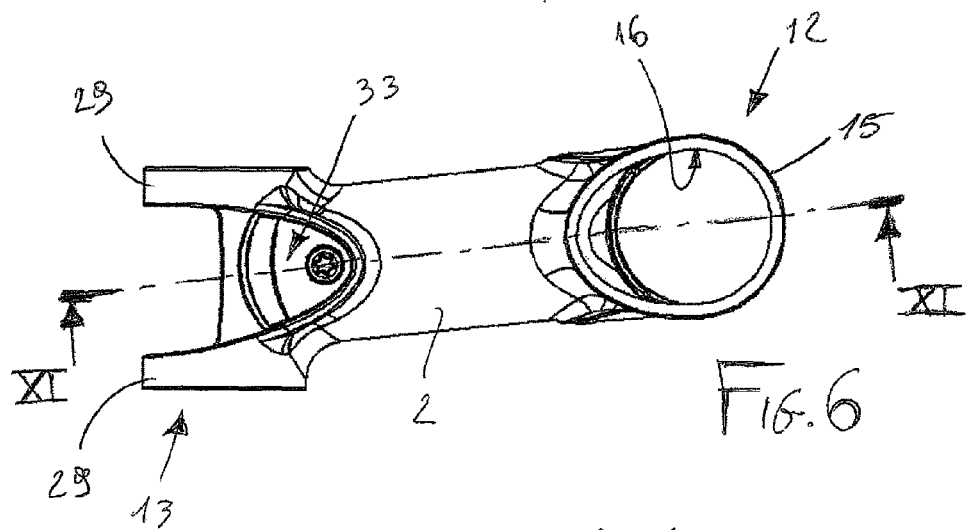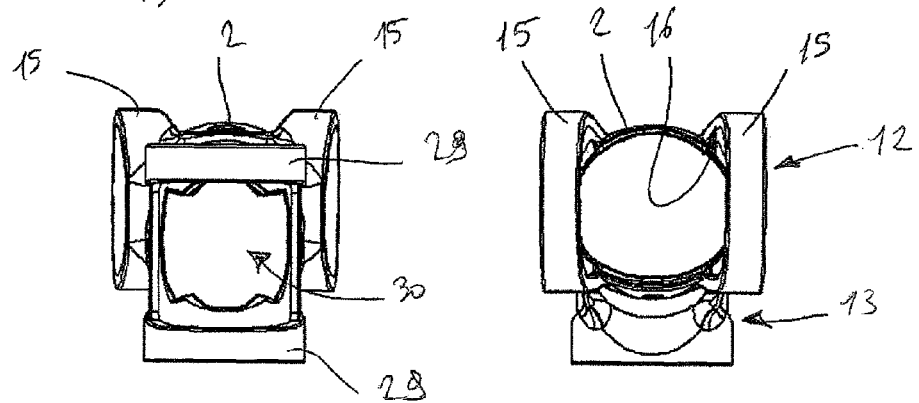

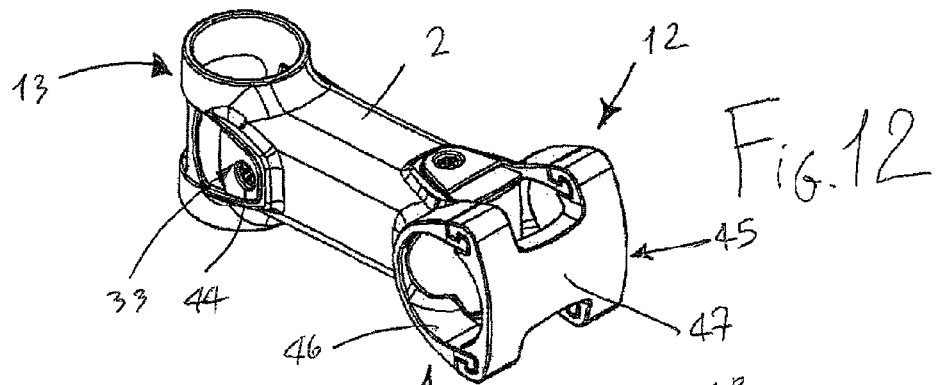
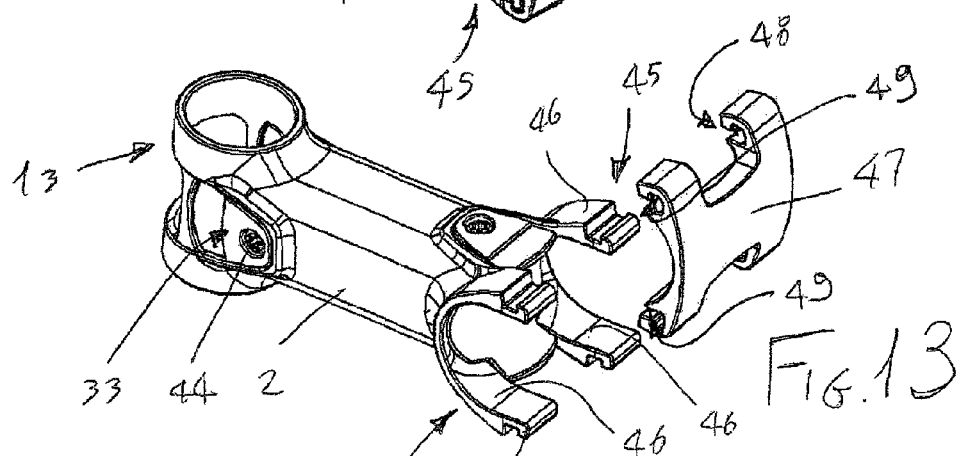
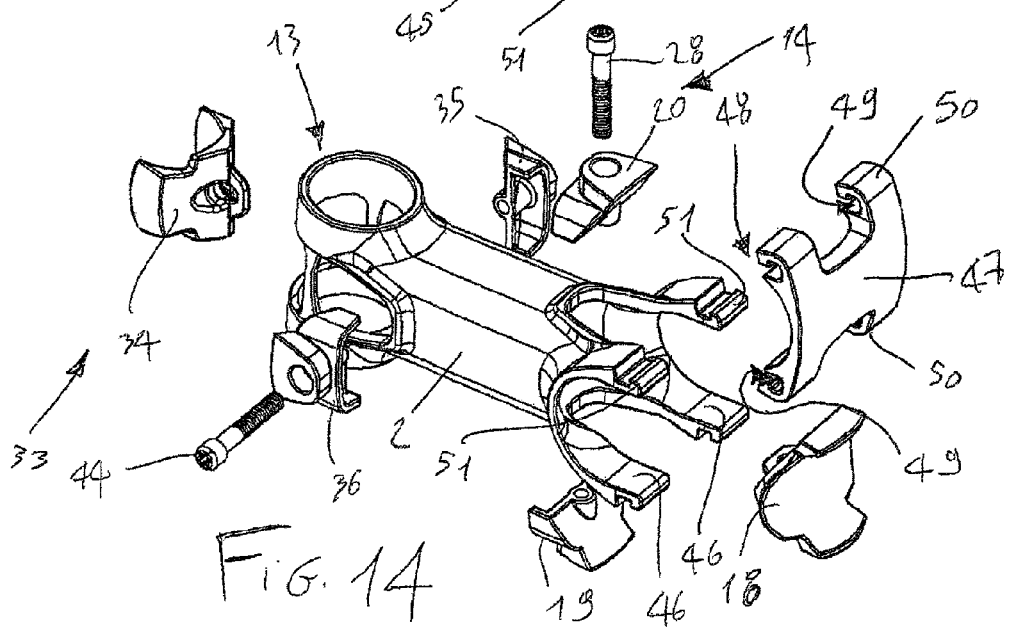

STEM FOR BICYCLE HANDLEBAR

FIELD OF THE INVENTION

The present invention relates to a stem for a bicycle handlebar, and in particular, to a stem for adjustably joining the handlebar to the steering fork of bicycles.

BACKGROUND

Stems are known for handlebars of bicycles and the like that comprise a support, generally tubular, provided with adjustable joining means to the steering fork and to the bar of the handlebar, in order to allow the user to adjust the handlebar, such as height, inclination, etc.

Some of the stems of the known type, such as described in U.S. Pat. No. 5,687,616, comprise, for instance, ample openings realized in the support of the same stem to allow the adjustable connection to the bar of the handlebar, but also, in some cases, with the steering fork.

Such openings define two opposed pipe portions that, opportunely shaped, realize a sort of clamp that is, for instance, shut around the bar of the handlebar with a bolt or with other equivalent removable means.

When the user makes an adjustment, for instance to vary the inclination of the handlebar to get a more comfortable position, the user must first loosen the bolt to unclamp the pip portions, adjust the handlebar to the desired position, and then tighten the bolt to secure the handlebar against the pipe portions.

The deformation to which the pipe portions of the support are submitted to shut the bar of the handlebar and the repeated operations of opening and tightening to make the handlebar adjustments can cause concentrate stress at both the handlebar and the pipe portions.

Such stress concentration, due also to the fact that the area of contact between the stem and the bar of the handlebar is rather limited, may cause breakings around the openings, mechanical clearances and other undesirable phenomena due to the mechanical stress concentrated in such critical zones.

In addition, the adjustment of the angular position of the bar of the handlebar is not easy or comfortable because it requires the manipulation of elastically deformable metallic parts.

These difficulties are still more evident when it is necessary to completely replace the bar of the handlebar, and not just to simply adjust its position.

SUMMARY

According to one embodiment, a stem for bicycle handlebar and the like includes a lengthened element, a first adjustable joining portion of the lengthened element to the bar of the handlebar and a second adjustable joining portion of the lengthened element to a fork steerer, where the first adjustable joining portion comprises a first wedge blocking means of the bar of the handlebar.

Such a stem, with a lengthened element, is free from openings, notches or other discontinuities that can reduce the resistance of the component and create harmful stress concentrations. The user can easily perform adjustments and assemblage, dismantlement, and maintenance operations.

Further advantageous characteristics are described with reference to the detailed description, figures and claims.

BRIEF DESCRIPTION OF THE DRAWINGS

These and further advantages will be better understood by one of ordinary skill in the art from the description that follows and from the attached drawings, given as a non-limiting example.

FIG. 5 is a plan view of the stem of FIG. 4;

FIG. 6 is a side view of the stem of FIG. 4;

FIG. 7 is a back view of the stem of FIG. 4;

FIG. 8 is a front view of the stem of FIG. 4;

FIG. 12 is a perspective view of another embodiment of the stem according to the present invention;

FIG. 13 is a perspective sight of the stem of FIG. 12, in a different situation of use;

FIG. 14 is a perspective exploded view of the stem of FIGS. 12 and 13; and

DETAILED DESCRIPTION

Figure 1:
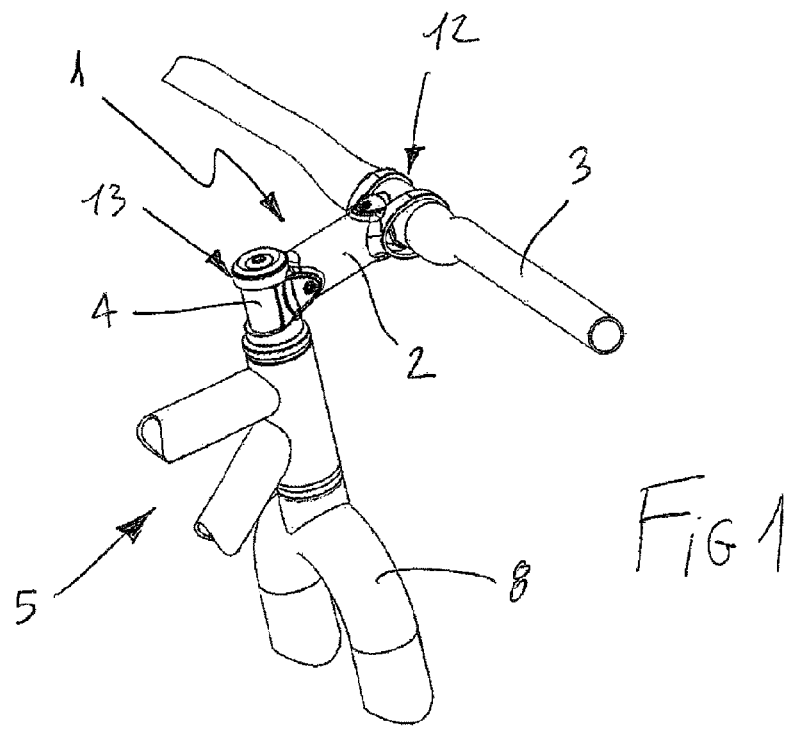
FIG. 1 is a perspective view of a bicycle handlebar with the stem according to one embodiment of the present invention.

With reference to the representation of FIG. 1, a stem 1 for bicycle handlebar and the like according to one embodiment is shown.

In the following embodiments individual characteristics, given in connection with specific embodiments, may actually be interchanged with other different characteristics that exist in other embodiments.

The stem according to the present embodiment is particularly, but not exclusively, directed to be mounted on bicycles; in fact, it can also be mounted on other similar transport means without any limitation.

Figure 2:
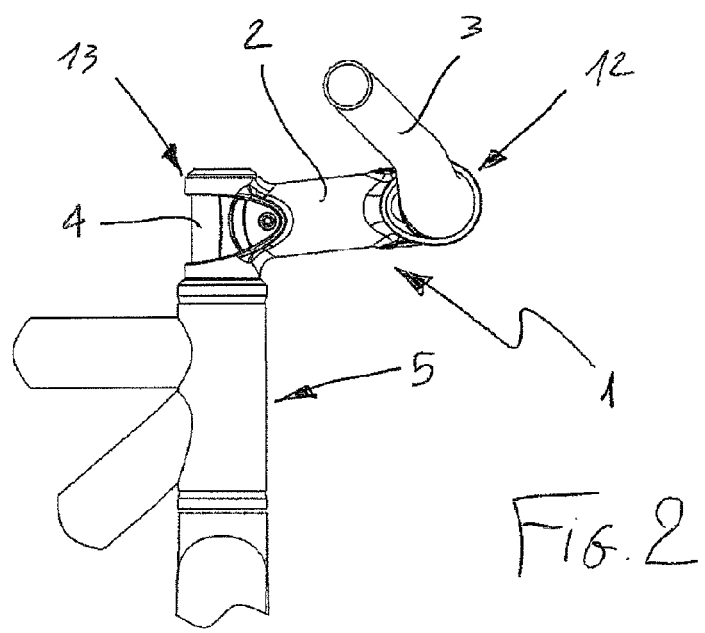
FIG. 2 is a side view of the handlebar of FIG. 1.

As illustrated in FIGS. 1 and 2, the stem 1 includes a lengthened element 2, with thin tubular conformation, and section which can be for instance circular, elliptic or others. The lengthened element 2 is for instance made of metallic material, of carbon fiber, or of plastic material, or still of other kinds of material with suitable mechanical characteristics.

In way known by itself, the lengthened element 2 or arm rigidly connects the bar of a bicycle handlebar 3 from a side and a steering fork 4 from the other side, where the steering fork 4 is connected to a bicycle frame 5.

Figure 3:
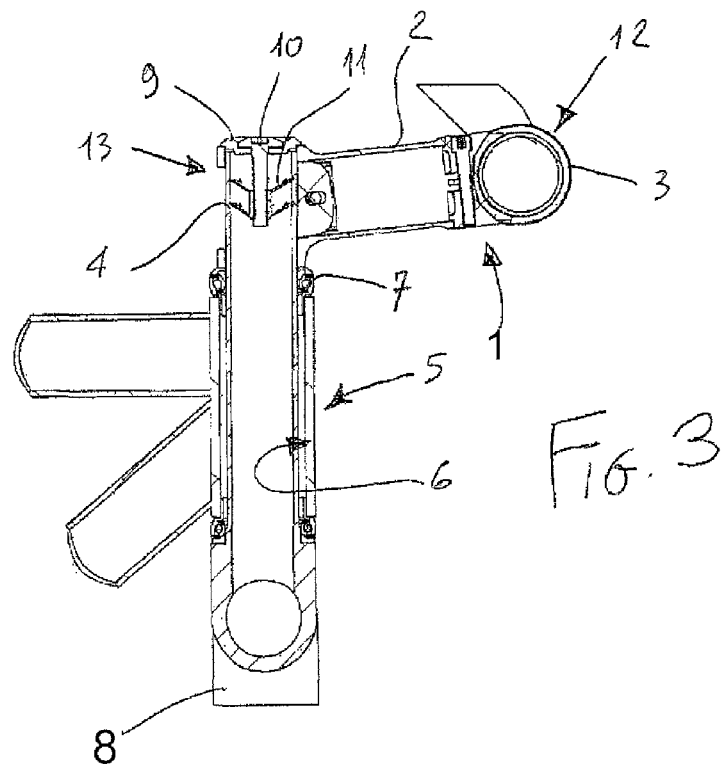
FIG. 3 is a cross section of the handlebar of FIG. 1.

As shown, particularly in FIG. 3, the steering fork 4 is inserted, in a known way, in a passing tubular seat 6 defined by a tubular piece of the bicycle frame 5 and coupled with a ball bearing 7 of the type known in the technical field. The steering fork 4 is rigidly connected to or part of a fork 8 of the anterior wheel of the bicycle, which is not represented in the figures.

The steering fork 4 includes an upper plug 9 secured by an upper screw 10 engaged in a nut 11, which is fixed to the upper opening of the steering fork 4 itself. The upper plug 9 holds in position the stem 1 along the steering fork 4, preventing it from being accidentally disengaged by the steering fork 4.

The stem 1 comprises a first adjustable joining portion 12 to the bar of the handlebar 3 and a second adjustable joining portion 13 to the steering fork 4.

The first adjustable joining portion 12 to the bar of the handlebar 3 includes a first wedge blocking means 14 of the bar 3 itself. Such first wedge blocking means 14 will be better described hereinafter.

Figure 4:
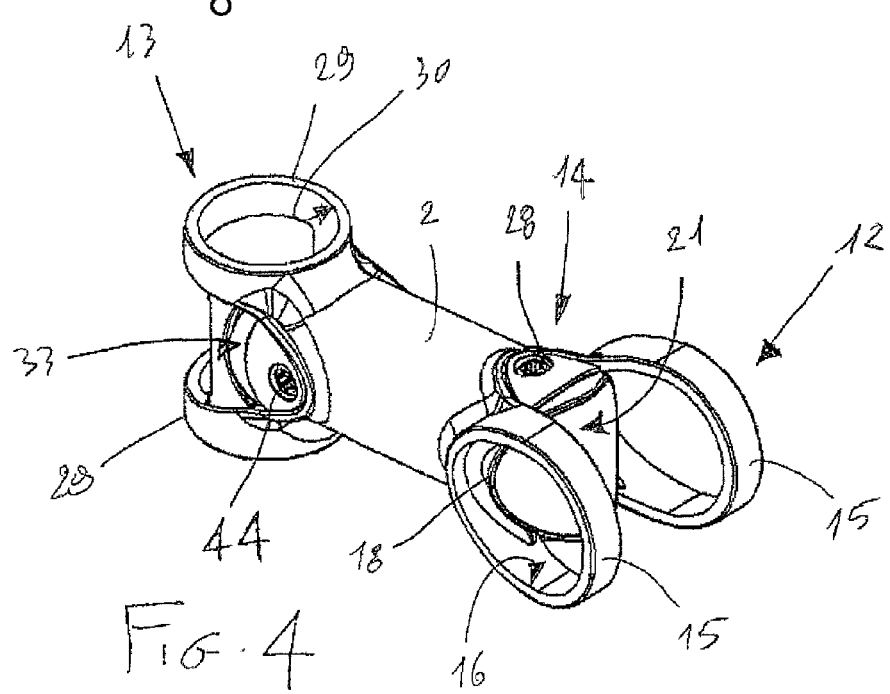
FIG. 4 is a perspective view of a stem according to one embodiment of the present invention.

As well visible in FIG. 4, the first adjustable joining portion 12 includes, furthermore, at least a first continuous band 15 that defines a first opening 16 in which the bar of the handlebar 3 is inserted.

More in detail, the aforesaid first adjustable joining portion 12 includes a two of first continuous bands 15. Such first continuous bands 15 are integral with the lengthened element 2 and they are symmetrically disposed with respect to the central axle of the lengthened element 2. The bands 15 are made of the same material of the lengthened element 2, but they can also be made of a different material.

In the portion included among the two first continuous bands 15, the lengthened element 2 defines two opposite first prominences 17, whose function will be described hereinafter.

Figure 15:
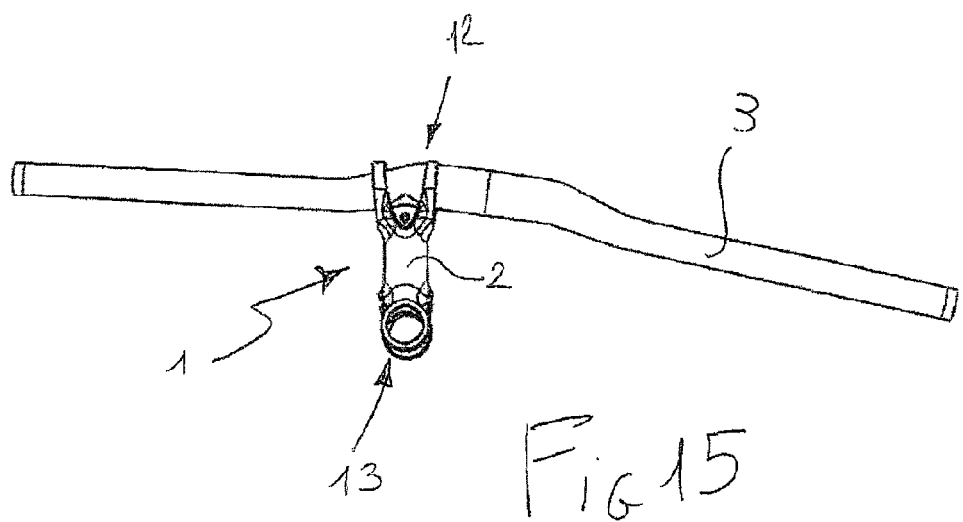
FIG. 15 is a perspective view of a stem in a phase of installation of an handlebar having a "rise".

The first opening 16, as visible in FIG. 4, has a substantially elliptic cross section, and more particularly an elliptic cross section which is substantially round in the area which contacts the handlebar 3. Such a shape allows the user to install a kind of handlebar 3 which has a "rise" as shown schematically in FIG. 15.

The first wedge blocking means 14 includes, as visible for instance in FIGS. 9 and 10, a first clamp 18 engaged in the first opening 16 and coupled to at least a first wedge 19 whose position is adjustable by the user, as will be described hereinafter.

More in detail, the first wedge blocking means 14 comprises two first wedges 19 and 20 coupled to the first clamp 18 at opposite sides.

As described in more detail hereinafter, the coupling of the wedges 19 and 20 with the first clamp 18 on tilted surfaces allows the user to move the first clamp 18 along a direction which is perpendicular to the axis of the bar of the handlebar 3, in order to block the latter inside the first opening 16 without clearance.

The first clamp 18, made for instance of aluminum material or of other materials of suitable characteristics, comprises a first concave surface 21 (shown in FIG. 10) suitable to be coupled to the external surface of the bar of the handlebar 3. The first clamp 18 includes, furthermore, two symmetrical first tilted faces 22, having inverse inclinations.

A first hole 23 is provided among the two first tilted faces 22, realized in a central portion of small thickness of the first clamp 18. As an alternative, the first hole 23 can be a slot or other type of opening.

Each one of the first wedges 19 and 20, made for instance of aluminum material or of other material of suitable characteristics, comprises a respective first tilted surface 24 suitable to engage one of the first tilted faces 22 of the first clamp 18. Furthermore, each one of the first wedges 19 and 20 includes a first relief 25 suitable to engage the respective first prominence 17 of the lengthened element 2.

Indifferently, the two first wedges 19 and 20 respectively include a first threaded passing hole 26 and a first smooth channel 27.

A first screw 28 is provided, allowing the user to adjust the position of the first wedges 19 and 20 with respect to one another, and therefore the position of the first clamp 18 inside the first opening 16. Particularly, the first screw 28 is engaged in a first threaded hole 26 provided in one of the first wedges 19, in the first hole 23 provided in the first clamp 18 and in the first channel 27 provided in the other one of the first wedges 20.

It is to be noted that the first hole 23 of the first clamp 18 has a diameter sufficiently greater than the external diameter the first screw 28, in order to allow a certain displacement of the first clamp 18, as it will appear clearer hereinafter. Such displacement is also possible in case the first hole 23 is a slot or other opening.

Figure 10:
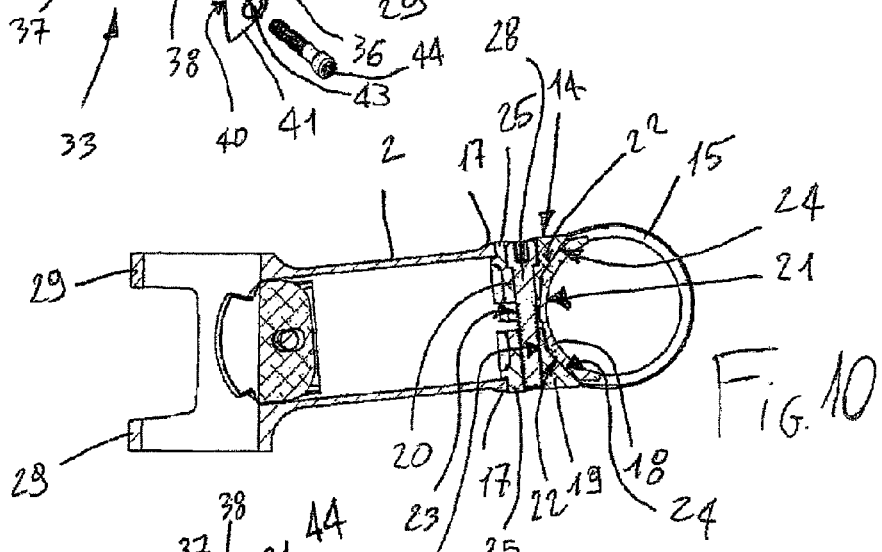
FIG. 10 is a cross section of the stem along line X-X of FIG. 5.

As it can be intuitively observed in FIG. 10, the selective tightening of the first screw 28 causes the mutual approach of the first wedges 19 and 20, and therefore, due to the contact of the first tilted surfaces 24 with the respective first tilted faces 22, the translation of the first clamp 18 is in a direction which is perpendicular to the axis of the bar of the handlebar 3. This causes the first clamp to move away from the lengthened element 2 and toward the bar of the handlebar 3, thereby tightening the bar.

The second adjustable joining portion 13 of the stem 1 includes at least a second continuous band 29 defining a second opening 30 in which the steering fork 4 is inserted. The second opening 30 has a circular section, although any other shape may be suitable.

More in detail, the second adjustable joining portion 13 includes two second continuous bands 29. Second continuous bands 29 are integral with the lengthened element 2 and they are symmetrically disposed with respect to the central axle of the lengthened element 2. The bands 29 are made of the same material as the lengthened element 2, but they can also be made of a different material.

In the portion included among the two second continuous bands 29, the lengthened element 2 defines two opposite second prominences 31, whose function will be described hereinafter.

Furthermore, the second continuous bands 29 are connected by reinforcing bridges 32 which are substantially parallel to the axis of the steering fork 4.

The second adjustable joining portion 13 to the steering fork 4 includes second wedge blocking means 33 of the steering fork 4.

Figure 9:
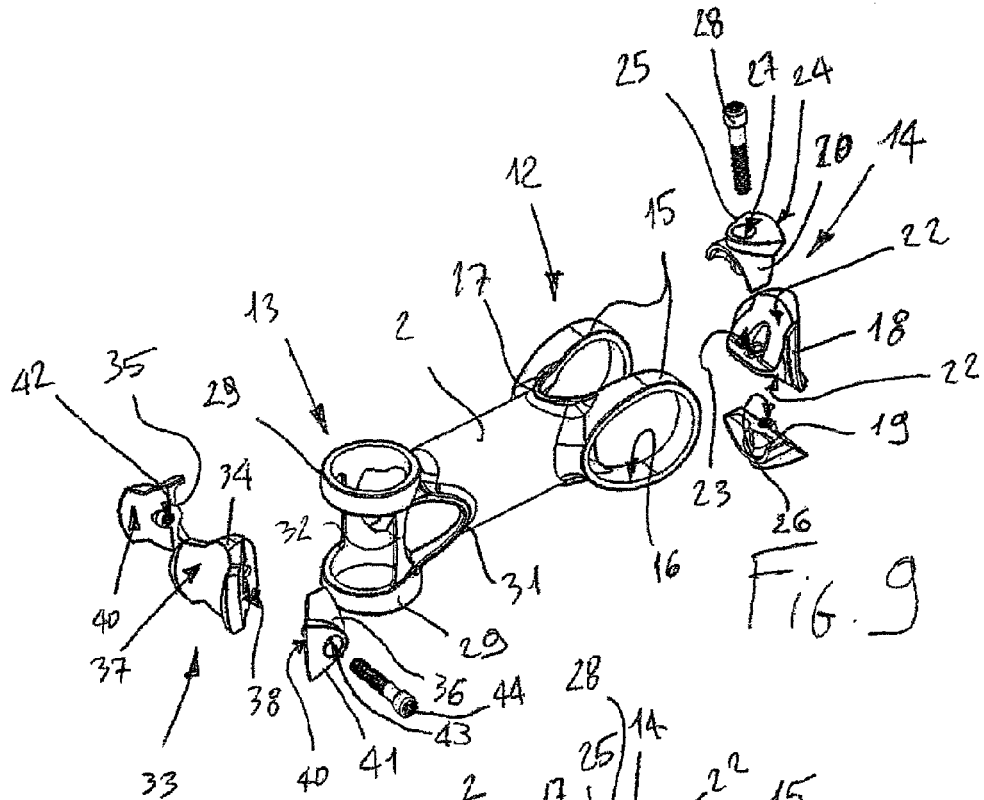
FIG. 9 is a perspective exploded view of the stem of FIG. 4.

The second wedge blocking means 33 substantially has the same structure as the first wedge blocking means 14, but they have however a different orientation in space, as visible for instance in FIG. 9.

The second wedge blocking means 33 includes, as visible for instance in FIGS. 9 and 11, a second clamp 34 engaged in the second opening 30 and coupled to at least a second wedge 35 whose position is adjustable by the user, as will be described hereinafter.

More in detail, the second wedge blocking means 33 comprises two second wedges 35 and 36 coupled to the second clamp 34 from opposite sides.

As better clarified hereinafter, the coupling of the second wedges 35 and 36, with the second clamp 34, on tilted surfaces, allows the user to move the second clamp 34 along a direction which is perpendicular to the axis of the steering fork 4, in order to block the latter inside the second opening 30 without clearance.

The second clamp 34, made for instance of aluminum material or of other materials of suitable characteristics, comprises a second concave surface 37 suitable to be coupled to the external surface of the steering fork 4. The second clamp 34 includes, furthermore, two symmetrical second tilted faces 38, having inverse inclinations.

A second hole 39 is provided among the two second tilted faces 38, realized in a central portion of small thickness of the second clamp 34. As an alternative, such second hole 39 can be a slot or other opening.

Each one of the second wedges 35 and 36, made for instance of aluminum material or of other material of suitable characteristics, comprises a respective second tilted surface 40 suitable to engage one of the second tilted faces 38 of the second clamp 34. Furthermore, each one of the second wedges 35 and 36 includes a second relief 41 suitable to engage the respective second prominence 31 of the lengthened element 2.

The two second wedges 35 and 36 respectively include a second threaded passing hole 42 and a second smooth channel 43.

A second screw 44 is provided, allowing the user to adjust the position of the second wedges 35 and 36 with respect to one another, and therefore the position of the second clamp 34 inside the second opening 30. Particularly, the second screw 44 is engaged in the second threaded hole 42 provided in one of the second wedges 35, in the second hole 39 provided in the second clamp 34 and in the second channel 43 provided in the other one of the second wedges 36.

It is to be noted that the second hole 39 of the second clamp 34 has a diameter sufficiently greater than the external diameter the second screw 44, in order to allow a certain displacement of the second clamp 34.

Figure 11:
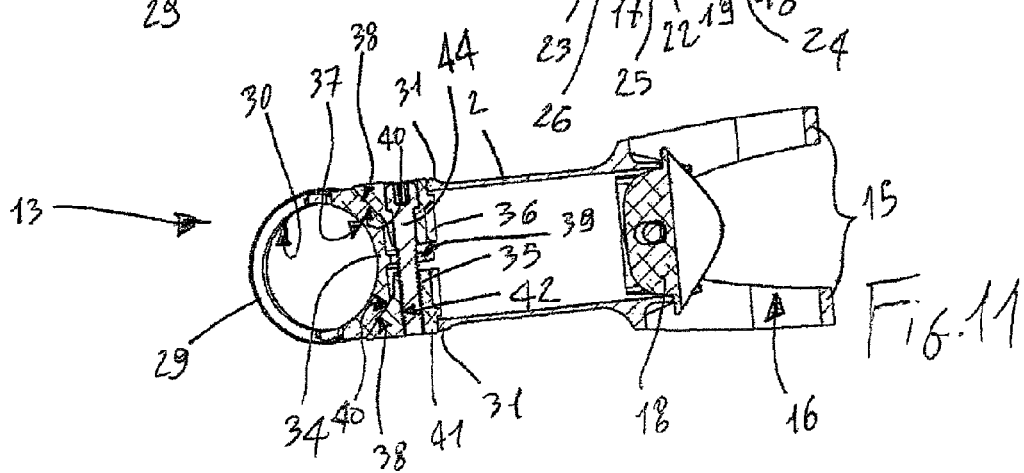
FIG. 11 is a cross section of the stem along the line XI-XI of FIG. 6.

As it can be intuitively observed in FIG. 11, the selective tightening of the second screw 44 causes the mutual approach of the second wedges 35 and 36, and therefore, due to the contact of the second tilted surfaces 40 with the respective second tilted faces 38, the translation of the second clamp 34 is in a direction which is perpendicular to the axis of the steering fork 4. This causes the second clamp to move away from the lengthened element 2 and toward the steering fork 4, thereby tightening the fork against the second clamp.

In a practical employment, the stem 1 allows the user to adjust in position and/or to mount and/or to remove both the steering fork 4 and the bar of the handlebar 3 in an extremely simple and easy way.

Regarding particularly the adjustment of the position of the bar of the handlebar 3 with respect to the stem 1, the user unscrews the first screw 28 in order to reciprocally move the first wedges 19 and 20 away from one another. In this way some room is made for the displacement of the first clamp 18, which in turn moves away from the bar 3, allowing the bar to be released and freely rotated. The bar of the handlebar 3, if necessary, can also be removed for maintenance and/or substitution.

After the adjustment of the position of the bar 3 or also after the positioning of a new bar 3, the user again acts on the first screw 28 tightening it so that to reciprocally move together the first wedges 19 and 20 and, therefore, to force the first clamp 18 against the surface of the bar of the handlebar 3, until it is secured by friction.

Regarding the adjustment of the position of the stem 1 with respect to the steering fork 4, the user acts on the second screw 44 in order to reciprocally move away the two second wedges 35 and 36 and to make room for the second clamp 34, which can withdraw and therefore release the steering fork 4, in a way analogous to the one already described more above with regard to the bar of the handlebar 3. Equally, the action of tightening the second screw 44 moves together the two second wedges 35 and 36 and forces the second clamp 34 against the surface of the steering fork 4, securing it by friction.

To remove the stem 1 from the steering fork 4, in case of necessity, the user unscrews the upper screw 10 to remove the upper plug 9.

Thus, with the stem as described above, the lengthened element 2 is free from elastically flexible parts defined by openings or carvings. Therefore it is more mechanically resistant because it is not subjected to concentrated stress. This means that it can be manufactured with a smaller amount of material, resulting in a lighter weight.

Furthermore, the presence of continuous bands 15 and 29 in the first portion 12 and the second portion 13, respectively, enables safer and tighter couplings respectively with the bar of the handlebar 3 and with the steering fork 4.

Other important advantages derive from the fact that the operations of adjustment and/or substitution of the bar 3 and/or the steering fork 4 can be effected in a rapid and easy way due to the screwing or unscrewing action on the first screw 28 and/or the second screw 44. More in detail, such operations can be effected by unscrewing the screws 28 and 44 only for a short stroke, enough to make sufficient room for the first clamp 18 and/or the second clamp 34 to release the bar 3 and/or the steering fork 4. In other words, it is not necessary to completely remove the screws 28 and 44 as may be required in other stems of known types.

Another advantage is that the contact surfaces, respectively, among the first clamp 18 and the bar of the handlebar 3 and among the second clamp 34 and the steering fork 4 are wider in comparison to the traditional type stems. In this way the contact pressures and the concentrated stresses are reduced. Consequently, lighter and/or cheaper materials can be used.

The first and second wedges 19, 20, 35, and 36, as well as the first clamp 18 and the second clamp 34, have respective tilted surfaces 24 and 40 and tilted faces 22 and 38 with inclinations that are carefully determined in order to allow an effective block of the bar of the handlebar 3 and of the steering fork 4, while at the same time avoiding an over-tightened locking, which may bring to anomalous stresses on the parts.

Again, the adjustments of the position of the bar of the handlebar 3 and of the stem 1 with respect to the steering fork 4 are completely independent from each other. Therefore, for instance it is possible to effect the adjustment of the position of the bar of the handlebar 3 after having completed the adjustment of the position of the stem 1 with respect to the steering fork 4, without any risk that one of the operations accidentally influences the other one.

Furthermore the parts that compose the stem 1, i.e., the lengthened element 2, the first and second clamps 18 and 34, the first and second wedges 19, 20, 35, and 36 can all be manufactured simply and at low costs. Inexpensive materials can be used for their manufacture because they are not critically stressed due to the wide contact surfaces and the absence of discontinuity in the materials.

Another embodiment of the stem according to the present invention is shown in FIGS. 12, 13, and 14.

In such figures and in the description that follows, the parts corresponding to those described in the preceding embodiment are indicated with the same reference numerals.

In the stem 1 according to the present embodiment, the first adjustable joining portion 12 includes at least a discontinuous band 45 which defines a first opening 16 in which the bar of the handlebar 3 is inserted.

More in detail, the first adjustable joining portion 12 includes two discontinuous bands 45 that define the first opening 16.

The discontinuous bands 45 are integral with the lengthened element 2, and they are symmetrical with respect to the central axis of lengthened element 2.

The discontinuous bands 45 include two respective substantially "U"-shaped elements 46 integral with the lengthened element 2, and a removable plate 47 provided with removable connecting means 48 to both the "U"-shaped elements 46 integral with the lengthened element 2.

The removable connecting means 48 are substantially of the dovetail type and they comprise four grooves 49, aligned two by two, provided in four appendixes 50 of the plate 47, and four bulges 51 provided respectively in the extremities of the "U"-shaped elements 46. The bulges 51 are suitable to slidingly engage the grooves 49, as illustrated in FIG. 12, in such way to be realized a removable closing of the first opening 16.

The tightening of the first wedge blocking means 14 against the bar of the handlebar 3 causes the zero resetting of clearances between the bulges 51 and the grooves 49, so that the plate 47 is fixed to the "U"-shaped elements 46.

This embodiment introduces the interesting technical advantage to allow the user to remove the bar of the handlebar 3, in case of necessity—for instance to effect the substitution or the maintenance of it—without preventively getting off the levers of the brake, the handle grips and other accessories eventually fixed along the bar 3 itself. In fact, to perform such removal it is enough to slightly loosen the first screw 28, in such a way to release the pressure of the first clamp 18 on the bar of the handlebar 3, so that the latter can slightly withdraw, releasing the plate 47. Then the plate 47 can be removed from the "U"-shaped elements 46 by lateral sliding, and then the user can directly access the bar of the handlebar 3 to remove it.

The present invention has been described according to preferred embodiments, but equivalent variants can be devised without departing from the scope of protection offered by the following claims.

The invention claimed is:

1. A stem for bicycle handlebar and the like comprising:
a lengthened element connecting the handlebar to a fork;
a first adjustable joining portion at a first end of the lengthened element to join the handlebar to the lengthened element, wherein the first adjustable joining portion comprises a first continuous band defining a first opening into which the handlebar is inserted; and
a second adjustable joining portion at a second end of the lengthened element to join the fork to the lengthened element, wherein the first adjustable joining portion comprises a first wedge blocking means operable by a user to move a first clamp for securing and loosening the handlebar from the lengthened element.

2. The stem according to claim 1, wherein the first adjustable joining portion further comprises a second continuous band defining the first opening.

3. The stem according to claim 2, wherein the first opening is substantially oval-shaped.

4. The stem according to claim 1, wherein the second adjustable joining portion comprises a second wedge blocking means operable to move a second clamp for securing and loosening the fork from the lengthened element.

5. The stem according to claim 4, wherein the second adjustable joining portion comprises a first band defining a second opening into which the fork is inserted.

6. The stem according to claim 5, wherein the second adjustable joining portion comprises a second band defining the second opening.

7. The stem according to claim 1, wherein the first clamp is engaged in the first opening and coupled to at least a first wedge adjustable by the user.

8. The stem according to claim 1, wherein the first wedge blocking means comprises two wedges, each wedge coupled to the first clamp at opposite sides.

9. The stem according to claim 7, further comprising a first screw movable to adjust the position of the first wedge.

10. The stem according claim 9, wherein the first wedge comprises a threaded hole and the first clamp comprises a hole to receive the first screw.

11. The stem according to claim 8, wherein the two wedges each comprise a threaded hole and the first clamp comprises a hole to receive a first screw such that the wedges move to close the first clamp when the first screw is tightened.

12. The stem according to claim 8, wherein the two wedges each comprise a threaded hole and the first clamp comprises a hole to receive the first screw such that the wedges move to release the first clamp when the first screw is loosened.

13. The stem according to claim 4, wherein the second clamp is engaged in the second opening and coupled to at least a second wedge adjustable by the user.

14. The stem according to claim 4, wherein the second wedge blocking means comprises two wedges, each wedge coupled to the second clamp at opposite sides.

15. The stem according to claim 13, further comprising a second screw movable to adjust the position of the second wedge.

16. The stem according to claim 13, wherein second wedge comprises a threaded hole and the second clamp comprises a hole to receive the second screw.

17. The stem according to claim 14, wherein the two wedges each comprise a threaded hole and the second clamp comprises a hole to receive a second screw such that the wedges move to close the second clamp when the second screw is tightened.

18. The stem according to claim 14, wherein the two wedges each comprise a threaded hole and the second clamp comprises a hole to receive a second screw such that the wedges move to release the second clamp when the second screw is loosened.

19. The stem according to claim 8, wherein the first clamp comprises a first concave surface corresponding to an external surface of the handlebar.

20. The stem according to claim 14, wherein the second clamp comprises a second concave surface corresponding to an external surface of the fork.

21. The stem according to claim 1, wherein the first adjustable joining portion comprises a first discontinuous band defining a first opening into which the handlebar is inserted.

22. The stem according to claim 21, wherein the first adjustable joining portion further comprises a second discontinuous band defining the first opening.

23. A stem for bicycle handlebar and the like, comprising:
an arm connecting the handlebar with a fork;
a first adjustable joining portion at a first end of the lengthened element to join the handlebar to the arm; and
a second adjustable joining portion at a second end of the arm to join the fork to the arm, wherein the first adjustable joining portion comprises a first wedge blocking means operable by a user to move a first clamp for securing and loosening the handlebar from the arm and a first discontinuous band that defines a first opening into which the handlebar is inserted, wherein the discontinuous band comprises a substantially "U"-shaped element integral with the arm and a plate provided with a removable connecting means to the "U"-shaped element.

24. The stem according to claim 23, wherein first adjustable joining portion further comprises a second discontinuous band that defines the first opening, the first and second discontinuous bands comprise two respective substantially "U"-shaped elements integral with the arm, and a plate comprising removable connecting means to both the "U"-shaped elements.

25. The stem according to claim 24, wherein the removable connecting means are substantially of the dovetail type and comprise at least two grooves, provided in two appendixes of the plate, and at least bulges provided respectively in the extremities of the "U"-shaped elements, the bulges being suitable to slidingly engage the grooves.

26. The stem according to claim 24, wherein the removable connecting means are substantially of the dovetail type and comprise four grooves aligned two by two, provided in four appendixes of the plate, and four bulges being provided respectively in the extremities of the "U"-shaped elements, the bulges being suitable to slidingly engage the grooves.

27. A stem for bicycle handlebar and the like comprising:
a lengthened element connecting the handlebar to a fork;
a first adjustable joining portion at a first end of the lengthened element to join the handlebar to the lengthened element; and
a second adjustable joining portion at a second end of the lengthened element to join the fork to the lengthened element, wherein the first adjustable joining portion comprises a first wedge blocking means operable by a user to move a first clamp for securing and loosening the handlebar from the lengthened element, wherein the first wedge blocking means corn rises two wedges, each wedge coupled to the first clamp at opposite sides.

* * * * *